United States Patent [19]

Hikmet

[11] Patent Number: 5,798,057
[45] Date of Patent: Aug. 25, 1998

[54] METHOD OF MANUFACTURING A SWITCHABLE CHOLESTERIC FILTER AS WELL AS A LUMINAIRE HAVING SUCH A FILTER

[75] Inventor: Rifat A. M. Hikmet, Eindhoven, Netherlands

[73] Assignee: U.S. Philips Corporation, New York, N.Y.

[21] Appl. No.: 768,476

[22] Filed: Dec. 18, 1996

[30] Foreign Application Priority Data

Dec. 21, 1995 [EP] European Pat. Off. .............. 95203589

[51] Int. Cl.$^6$ .......................... C09K 19/00; C02F 1/1335
[52] U.S. Cl. .......................... 252/299.5; 349/104; 428/1
[58] Field of Search .................... 252/299.01, 299.5; 428/1; 349/183, 185, 104, 106; 438/30

[56] References Cited

U.S. PATENT DOCUMENTS 5,602,661  2/1997  Schadt et al. ...................... 349/124

FOREIGN PATENT DOCUMENTS

0643121A1  3/1995  European Pat. Off. .

OTHER PUBLICATIONS

"Photochemistry of Man–made Polymers" by John F. McKellar et al, Applied Science Publishers Ltd., London, 1979, pp. 216–255.

*Primary Examiner*—Shean C. Wo
*Attorney, Agent, or Firm*—Norman N. Spain

[57] ABSTRACT

The invention provides a simple method of manufacturing a broadband, switchable cholesteric filter. To this end, a mixture of polymerizable, liquid-crystalline molecules is provided between two, substantially parallel substrates, which are each provided with an electrode. This mixture is subsequently polymerized with UV light to form an optically active layer of cholesteric order comprising a three-dimensional polymeric network. If the mixture also contains a quantity of a photo-stabilizing compound, a broadband, cholesteric filter is obtained. The mixture preferably comprises, in addition to maximally 5 wt. % of the photo-stabilizing compound, maximally 2 wt. % of monomers having at least two polymerizable groups, maximally 90 wt. % of liquid-crystalline monomers having one polymerizable group, as well as a mixture of chiral and/or achiral liquid-crystalline molecules without a polymerizable group. Switchable cholesteric filters having a bandwidth of 200 nm and more can be obtained in this manner.

8 Claims, 6 Drawing Sheets

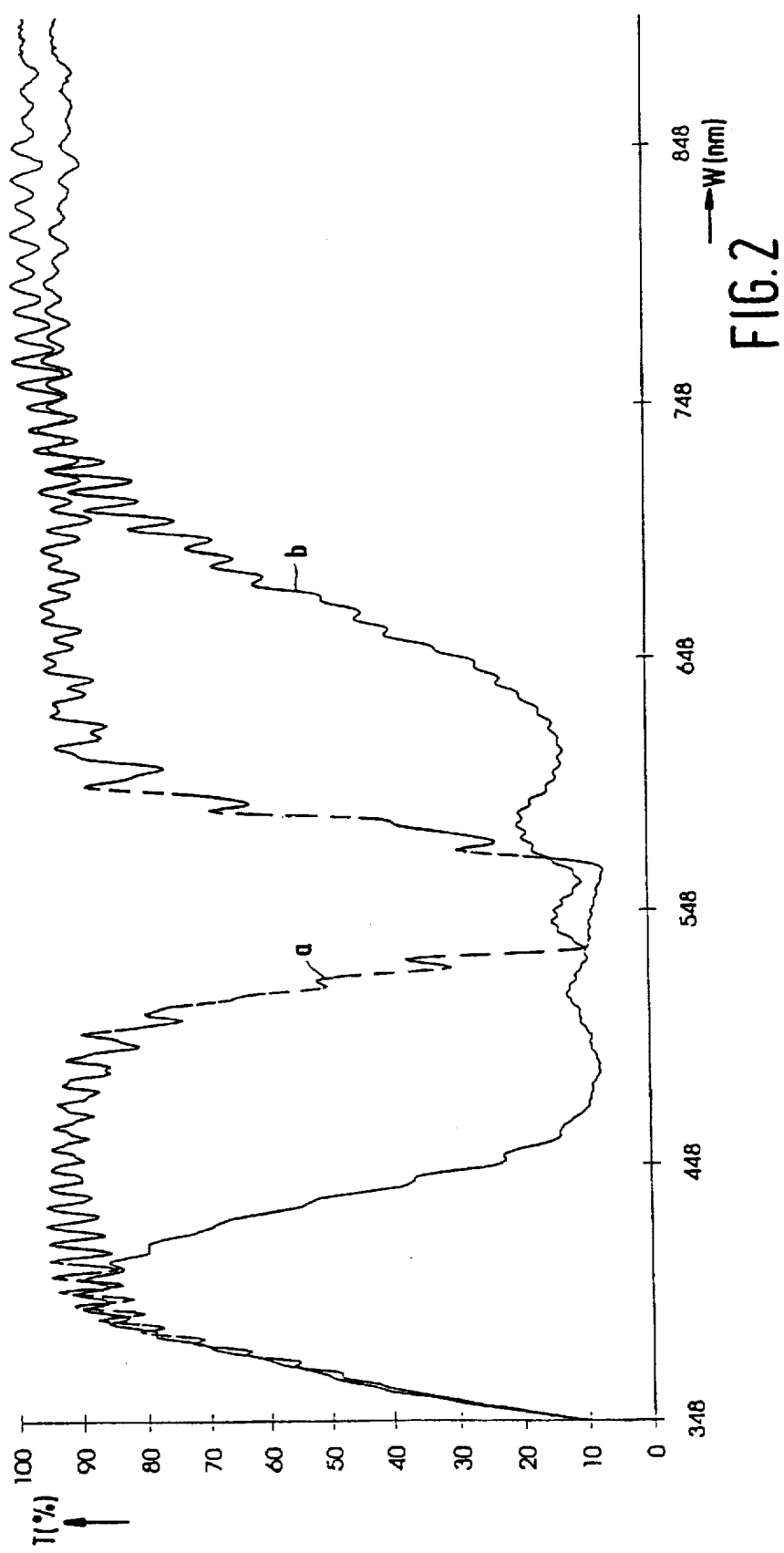

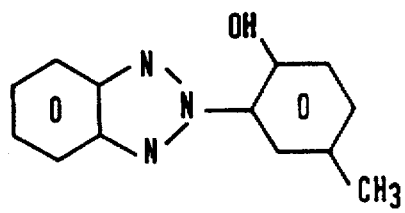 (1)
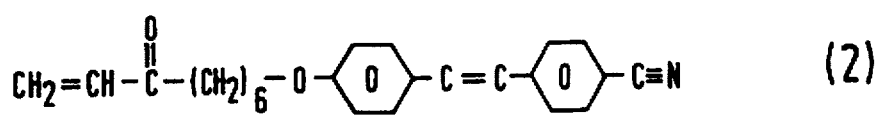 (2)
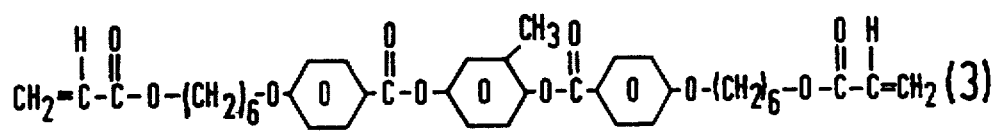 (3)
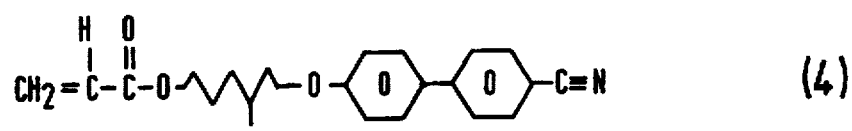 (4)
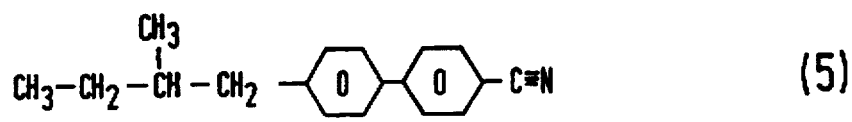 (5)
 (6)
FIG. 7

5,798,057

1

METHOD OF MANUFACTURING A SWITCHABLE CHOLESTERIC FILTER AS WELL AS A LUMINAIRE HAVING SUCH A FILTER

BACKGROUND OF THE INVENTION

The invention relates to a method of manufacturing a switchable cholesteric filter comprising an optically active layer, in Which a mixture of polymerizable, liquid-crystalline molecules is provided between two, substantially parallel substrates, which are each provided with an electrode for applying an electric field, said mixture subsequently being polymerized by means of UV light to form an optically active layer of cholesteric order comprising a three-dimensional polymeric network. The invention also relates to a luminaire which is provided with such a switchable cholesteric filter.

A method of the type mentioned in the opening paragraph is known per se. For example, in European Patent Application EP 643.121-A1, a description is given of the manufacture of a switchable cholesteric filter. Said filter is manufactured by providing a polymerizable mixture between two, substantially parallel transparent substrates which are each provided with a transparent electrode, for example, of ITO. The mixture used in said method contains various types of liquid-crystalline molecules, which comprise zero, one or two polymerizable groups. The composition of the mixture is chosen to be such that a cholesteric order occurs at a specific temperature. By polymerizing the ordered mixture between the substrates by means of UV radiation, a switchable, optically active layer having a cholesteric order is obtained.

Owing to the fact that the mixture contains a certain quantity of molecules having one polymerizable group as well as a relatively small quantity of molecules having two polymerizable groups, the polymerized, optically active layer comprises a slightly crosslinked polymeric network. By virtue of said network, the cholesteric filter has a satisfactory thermal stability as well as good switching properties. It is noted that the expression "switching of a cholesteric filter" is to be understood to mean herein "changing the reflection characteristic of the filter, such as in particular the intensity of the reflection band, under the influence of an electric field".

The cholesteric filter obtained by means of the known method has an important disadvantage. It has been found that the bandwidth of the known filter is relatively small, i.e. in general approximately 70 nm. For a number of applications of the filter, this bandwidth is insufficient. This applies, in particular, if the reflection band of the filter should comprise the entire spectrum of visible light, or at least a substantial part thereof. In principle, this problem can be solved by using a stack of cholesteric filters whose reflection bands are in different positions relative to each other, so that the filters together cover a substantial part of the visible spectrum. The disadvantage of this solution is that a construction is obtained which has a relatively large overall thickness, that transmission losses occur as a result of the large number of electrode layers, and that losses occur due to light diffusion between the individual filters. It is noted that the term "bandwidth" is to be understood to mean the width of the reflection band or transmission band measured halfway the height of the band.

SUMMARY OF THE INVENTION

It is an object of the invention to obviate the above-mentioned disadvantage. The invention more particularly aims at a method of manufacturing a switchable, cholesteric filter whose bandwidth is considerably larger than 70 nm, preferably larger than 100 nm, and, in particular, larger than 150 nm.

These and other objects are achieved by a method of manufacturing a switchable, cholesteric filter comprising an optically active layer, in which a mixture of polymerizable, liquid-crystalline molecules is provided between two, substantially parallel substrates, which are each provided with an electrode for applying an electric field, said mixture subsequently being polymerized by means of UV light to form an optically active layer of cholesteric order comprising a three-dimensional polymeric network, which method is characterized in accordance with the invention, in that a quantity of a photo-stabilizing compound is added to the mixture.

The method in accordance with the invention enables switchable, cholesteric filters to be manufactured which have a relatively wide reflection band. For example, bandwidths of 100 nm and 150 nm have been achieved by means of the method in accordance with the invention. It has been found that filters having a bandwidth of 200 nm, and even 250 nm or more, can be manufactured by means of the inventive method.

The invention is based on the experimentally gained insight that the presence of photo-stabilizing compounds in the polymerizable mixture gives rise to the formation of an inhomogeneous polymeric network. The exact working mechanism of the invention is not (yet) known. It is assumed that during the polymerization process domains are formed in the mixture to be polymerized around the molecules of the photo-stabilizing compounds, and that polymerization is retarded within said domains. As a result, small differences in concentration between the polymerizable molecules inside these domains and outside these domains occur, so that diffusion of these molecules takes place. As a result, the network eventually formed exhibits a more or less inhomogeneous structure in the optically active layer. This inhomogeneous structure of the network leads to a certain degree of variation in the pitch of the helix-like structure formed in the optically active layer, which structure is characteristic of the cholesteric order in the layer. Said variation in pitch is preserved, also after termination of the polymerization process, partly because (a part of) the molecules causing the cholesteric order are incorporated in the network. This possible working mechanism can explain why the cholesteric filter formed has such a relatively large bandwidth.

It is noted that the photo-stabilizing compounds as well as their working mechanism are known per se, for example, from "Photochemistry of Man-Made Polymers", J. F. Mc. Kellar and N. S. Allen, Applied Science Publishers Ltd, London, 1979, pp. 216–255. Such compounds are customarily added to polymers which have already been formed, to preclude decomposition of said polymers under the influence of sunlight.

At the operating temperature, the cholesteric filter manufactured in accordance with the invention exhibits a very rapid switching behavior. This occurs when an electric field is applied across the optically active layer or when the intensity of such an electric field is changed. It has been found that the intensity of the relatively wide reflection band decreases substantially if an electric field is applied across the optically active layer by means of the electrodes. If the electric field is removed, the original, relatively wide reflection band returns instantly.

It has further been found that the switching behavior of the cholesteric filter in accordance with the invention is remarkably reproducible when said filter is used over a prolonged period of time. In experiments it has been established that after approximately 1,000 switching operations the wavelength and the intensity of the reflection band are unchanged after removal of the voltage. The reflection characteristic of the filter, which is measured before and after the switching test, is substantially unchanged. In the switching process, the maximally required field strengths are of the order of 20 V/micron or less.

A preferred embodiment of the method in accordance with the invention is characterized in that the quantity of the photo-stabilizing compound which is added to the mixture amounts maximally to 5 wt. %, calculated with respect to the overall volume of the mixture. It has been found that larger quantities may lead to relatively great disturbances in the formation of the polymeric network. This causes optical losses in the filter. The quantity of photo-stabilizing compound preferably amounts to 0.05–2.5 wt. % relative to the overall volume of the mixture.

Another preferred embodiment of the method in accordance with the invention is characterized in that a compound of the "excited state quencher" type is added as the photo-stabilizing compound. Such compounds are capable of deactivating "photo-excited" compounds before the latter can be converted to radicals which might go on reacting. It has been found that the necessary quantity of this type of photo-stabilizing compound is much smaller than that of other types of compounds, such as UV-absorbing compounds or free-radical scavenging compounds. If use is made of excited state quenchers, quantities of 0.02–1.5 wt. %, calculated with respect to the overall volume of the mixture, are sufficient.

Another interesting embodiment of the method in accordance with the invention is characterized in that for the photo-stabilizing compound use is made of a compound whose composition corresponds to the formula

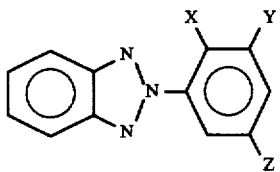

where X, Y and Z are moieties selected from the groups consisting of H, OH, $CH_3$ and $C(CH_3)_3$. This class of compounds is marketed under the trade name Tinuvin (Ciba Geigy).

Preferably, Tinuvin P (X=OH, Y=H and Z=$CH_3$) or Tinuvin 327 (X=OH, Y=$C(CH_3)_3$ and Z=$C(CH_3)_3$) are selected. In experiments it has been established that these compounds are readily miscible with customary liquid-crystalline monomers. By virtue thereof, polymerization of the mixture takes place very uniformly.

Another interesting embodiment of the method in accordance with the invention is characterized in that for the photo-stabilizing compound use is made of a compound whose composition corresponds to the formula

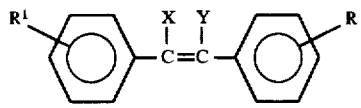

where X and Y are moieties selected from the groups consisting of H and an electron-accepting group such as CN or $NO_2$, and where R and R' are groups selected from the series consisting of H, an electron-accepting group such as CN or $NO_2$, an aliphatic group and an aromatic group. Particular preference is given to the compound in which X=Y=H and R=para—CN and R'=para—O—C(O)—CH=$CH_2$ as well as to the compound in which X=R=H and Y=CN and R'=para-O—C(O)—CH=$CH_2$. Experiments have shown that the use of these compounds leads to a relatively large increase of the bandwidth of the cholesteric filter.

Good results were also achieved by means of a method of manufacturing a switchable cholesteric filter, which is characterized in that the mixture contains maximally 2 wt. % of monomers having at least two polymerizable groups, maximally 90 wt. % of liquid-crystalline monomers having one polymerizable group as well as a mixture of chiral and/or achiral liquid-crystalline molecules without polymerizable group.

Due to the presence of relatively few monomers with two or more polymerizable groups as compared to monomers with one polymerizable group, a very slightly crosslinked polymeric network is formed during the polymerization of the optically active layer. The quantity of monomers with two or more polymerizable groups is preferably maximally 2 wt. % relative to the overall volume of the polymerizable mixture. If a larger quantity of this type of monomers is used, the modulus of elasticity (E) of the polymerized layer becomes too large. This results in relatively high switching voltages and a slow and incomplete response of the liquid-crystalline material to the application or the change of an electric field. This adversely affects the switching behavior of a cholesteric filter. It has been found that the desired properties of the cholesteric filter are optimal if, during the manufacture of the optically active layer, a quantity of approximately 0.1–1 wt. % of monomers with two or more polymerizable groups is used.

The quantity of monomers with one polymerizable group preferably amounts maximally to 90 wt. %, calculated with respect to the overall volume of the polymerizable mixture. If a larger quantity of this type of monomer is used, the viscosity of the polymerized, optically active layer becomes unacceptably high. This adversely affects the switching behavior of the optical layer. Switching of the filter at the operating temperature becomes practically impossible under these circumstances. It has been found that the desired properties of the cholesteric filter are optimal if, during the manufacture of the optically active layer, a quantity of 20–60 wt. % of monomers with one polymerizable group is used. The monomers with one polymerizable group can be chiral as well as achiral.

In the optically active layer of the cholesteric filter manufactured in accordance with the inventive method, two different types of liquid-crystalline groups can be distinguished. In the first place, the filter comprises liquid-crystalline groups which are linked as side groups to the chains of the network via a single chemical bond. This first type of liquid-crystalline groups originates from the liquid-crystalline monomers which were provided with one polymerizable group. In addition, the filter comprises liquid-crystalline groups which are not linked to the network via a chemical bond. This second type of liquid-crystalline groups originates from the liquid-crystalline compounds which are chemically inert. Since the first type of liquid-crystalline groups is linked to the chains of the network via a chemical bond, their mobility in the optically active layer is smaller than that of the second type of liquid-crystalline groups. Under these conditions, the first type of groups can function as a kind of switch between, on the one hand, the liquid-crystalline molecules which are freely incorporated in the network and, on the other hand, the relatively rigid network.

Dependent upon the desired reflection characteristic of the filter, a larger or smaller proportion of the free molecules is chiral, and the rest is achiral. These liquid-crystalline molecules do not comprise polymerizable groups and hence are considered "chemically inert" or "free". After the polymerization of the mixture, these chemically inert molecules form, as it were, a mobile phase between a stationary phase, which is formed by the chains of the three-dimensional polymeric network. The liquid-crystalline group(s) of the free molecules interact(s), such as "stacking", with the liquid-crystalline groups incorporated in the network. The ratio between the chiral and achiral molecules, as well as the exact chemical structure of these compounds, determine to a substantial degree the reflection characteristic of the broadband, cholesteric filter. The polymerizable mixture also contains a small quantity of a photo-initiator.

The monomers which comprise at least two polymerizable groups, preferably include a liquid-crystalline group. After polymerization, this type of molecules is incorporated in the network via two chemical bonds at locations where the polymer chains are cross-linked. By using this type of monomers, it is achieved that the position and the shape of the reflection band of the cholesteric filter obtained in accordance with the inventive method is even less temperature-sensitive. By virtue thereof, the filter can be used in a relatively wider temperature range.

For the UV-polymerizable groups of the monomers, use can be made of all types of UV-curable groups, such as epoxy compounds, vinyl-ether compounds and/or thiolene systems. In a favorable embodiment of the method in accordance with the invention, (meth)acrylate groups are used as the polymerizable groups of the monomers. It has been found that this type of polymerizable groups enables high-quality optically active layers to be obtained. In addition, (meth)acrylate is completely polymerized in a very efficient process.

The invention also relates to a luminaire comprising a connection for a light source and a cholesteric filter. In accordance with the invention, a broadband, switchable cholesteric filter is used, which is manufactured in accordance with the method described hereinabove. This type of luminaire in accordance with the invention enables the state of polarization of the emergent light to be influenced in a simple and reproducible manner.

Broadband, switchable cholesteric filters manufactured in accordance with the inventive method can be used in circular polarizers and reflectors as well as in so-called "notch filters" and "bandpass filters". In said devices they are used as a shutter, dimmer or beam splitter. They can also be used in passive or active matrix displays as well as in datagraphic and after numeric displays. They can also suitably be used in fiber-optical systems and in gas-discharge lamps.

BRIEF DESCRIPTION OF THE DRAWING

In the drawings:

FIG. 2 shows two spectra in which the transmission T is plotted as a function of the wavelength W of a filter which is manufactured in accordance with the inventive method.

FIG. 7 shows a formula sheet.

DETAILED DESCRIPTION OF THE INVENTION

Figure 1:
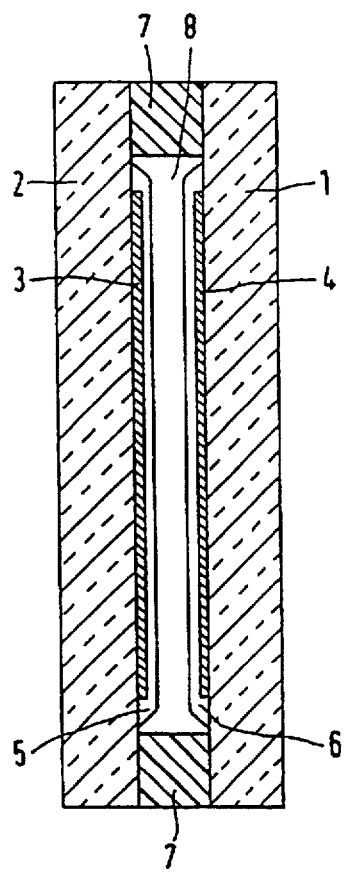
FIG. 1 is a schematic, cross-sectional view of a switchable cholesteric filter (not to scale), which is manufactured by means of the method in accordance with the invention.
Figure 6:
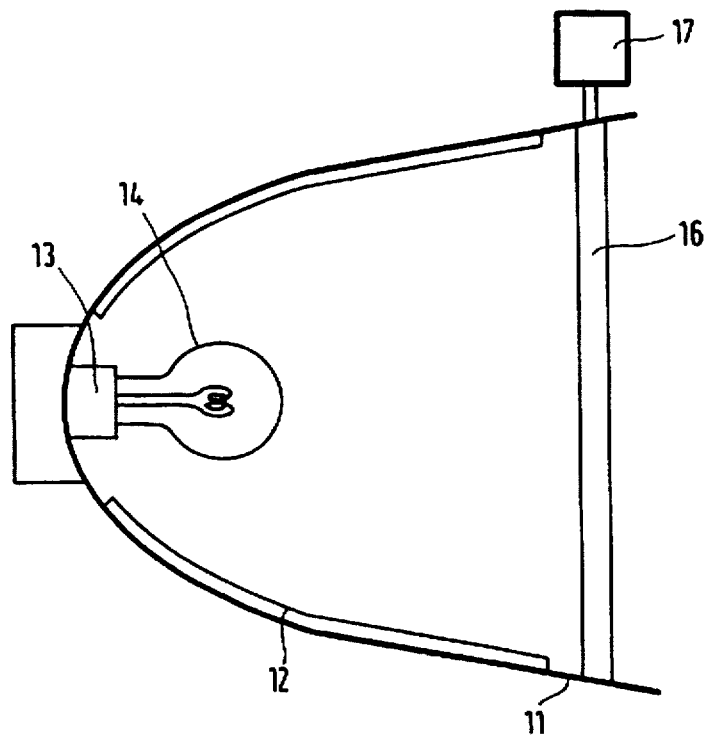
FIG. 6 shows a luminaire in accordance with the invention.

The invention will now be described in greater detail with reference to the figures of the drawing.

FIG. 1 shows a broadband, switchable cholesteric filter which is manufactured in accordance with the invention. This filter comprises two flat, transparent substrates 1 and 2, for example, of glass or a flexible, transparent synthetic resin, which extend substantially parallel to each other and which are spaced some distance apart. The correct distance between the substrates is maintained by spacers (not shown). These spacers consist of balls or fibers of uniform diameter which are present between the substrates.

Each of the substrates is provided with a transparent, electric electrode 3 and 4, for example of ITO, on the side facing the other substrate. Preferably, the substrates are also provided with orientation layers 5 and 6, for example, of rubbed polyimide or obliquely sputtered $SiO_x$. The edges of the substrates are provided with a packing strip 7. The substrates and the packing strip enclose a space which accommodates an optically active layer 8. This layer has a thickness of 6 microns. In principle, the layer thickness may range from 0.5 to 20 microns. Preferably, however, the layer thickness ranges from 1 to 10 microns.

In accordance with the inventive method, a mixture of polymerizable, liquid-crystalline molecules is introduced into said space. The mixture typically comprises maximally 2 wt. % of monomers with at least two polymerizable groups, and maximally 30 wt. % of liquid-crystalline monomers with one polymerizable group, as well as a mixture of chiral and achiral liquid-crystalline molecules without polymerizable groups. In accordance with an essential characteristic of the inventive method, the mixture also comprises a small quantity of a photo-stabilizing compound.

In the present case, a mixture consisting of 0.4 wt. % of the diacrylate C6M (see formula 3 of the formula sheet in FIG. 7), 40 wt. % of the chiral monoacrylate in accordance with formula 4 of the formula sheet, 19 wt. % of the non-reactive chiral CB15 (formula 5 of the formula sheet), 40 wt. % of the non-reactive achiral B164 (formula 6 of the formula sheet) and 1 wt. % of the photo-stabilizing compound Tinuvin P (Ciba Geigy; see formula 1 of the formula sheet) was used. A quantity of 2 wt. % of the photo-initiator Irgacure 651 (Ciba Geigy) was added to this mixture. After the mixture was provided between the substrates (spacing 6 microns), it was polymerized by exposing it to radiation from an UV source (wavelength 366 nm) for 20' at an intensity of 0.1 $mW/cm^2$.

FIG. 2 shows the transmission spectrum of the switchable cholesteric filter, (a) before and (b) after polymerization. The transmission T (%) is plotted as a function of the wavelength W (nm). After polymerization, the bandwidth has increased considerably. Prior to polymerization, the bandwidth was approximately 70 microns. After polymerization, the bandwidth had increased to approximately 200 microns. If no photo-stabilizing compound is present in the polymerizable mixture, there is no noticeable change in bandwidth after the polymerization process (not shown).

Figure 3:
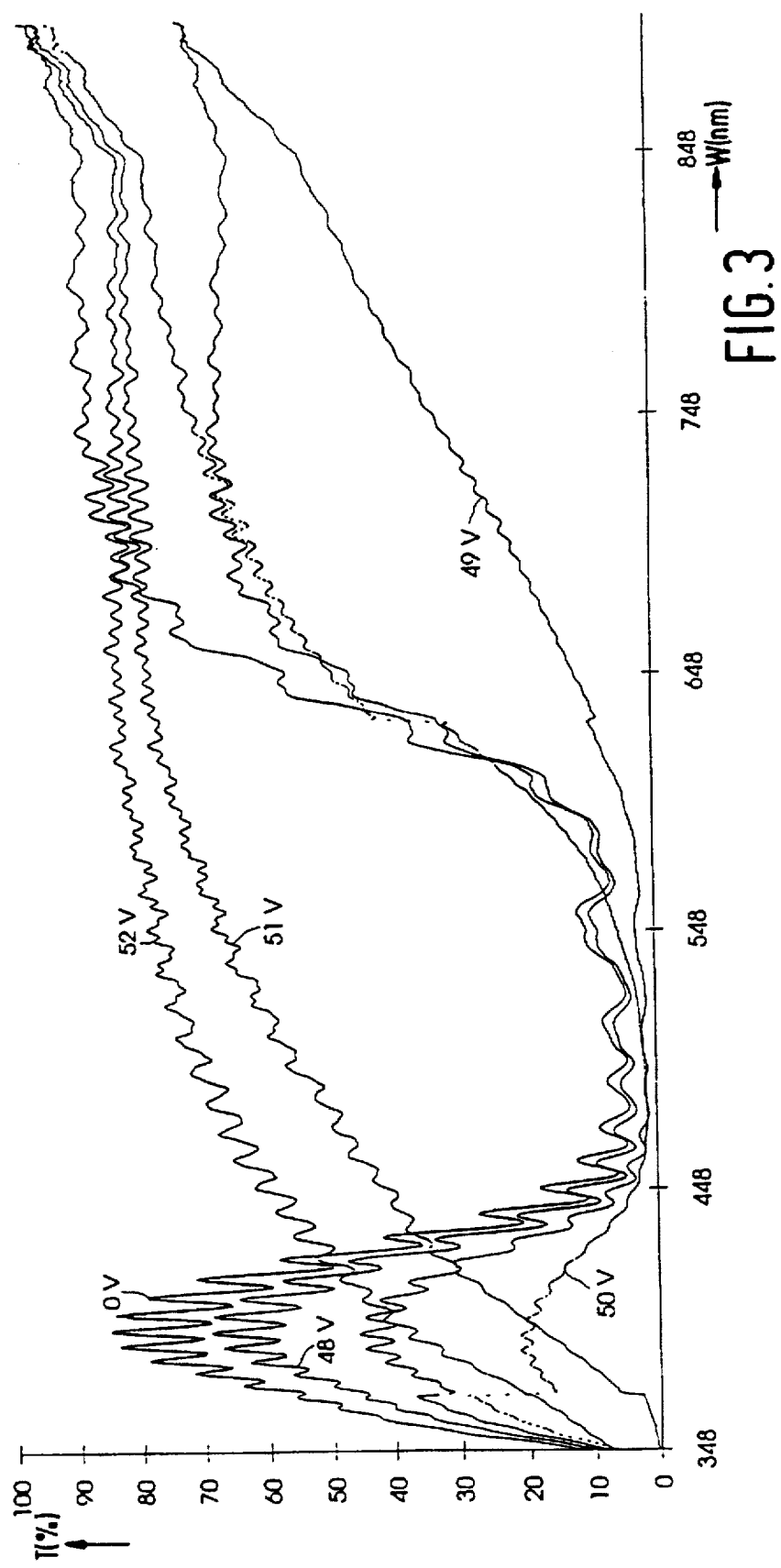
FIG. 3 shows a number of spectra in which the transmission T is plotted as a function of the wavelength W of an inventive filter used at different field strengths.

FIG. 3 shows further transmission spectra of the above-described broadband filter. In this case, the transmission T (%) is plotted as a function of the wavelength W (nm). The spectra are measured in the absence of a voltage (0 V) and in the presence of a voltage of 48, 49, 50, 51 and 52 V. When these voltages are applied, the transmission increases substantially in the range which is interesting for this application, i.e. from approximately 450 to 650 nm. After removal of the electric field, the original transmission band around 550 nm is immediately restored. Switching between both extreme states, i.e. between 50 V and 52 V, can be repeated many times without the occurrence of an important change in the spectra. All measurements are carried out at room temperature.

Figure 4:
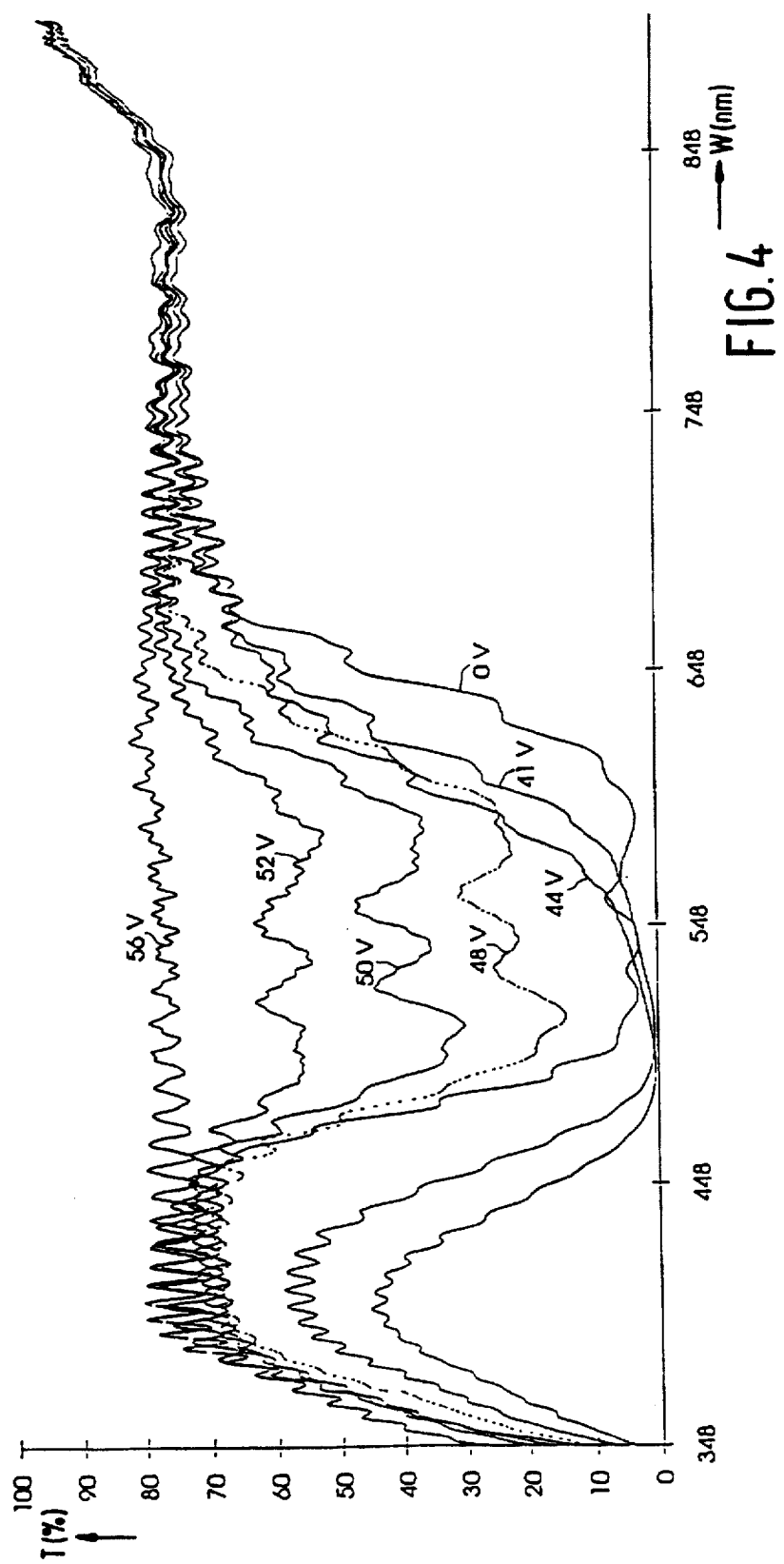
FIG. 4 shows a number of spectra in which the transmission T is plotted as a function of the wavelength W of another inventive filter used at different field strengths.

FIG. 4 shows transmission spectra of another embodiment of a broadband, switchable cholesteric filter, which was manufactured in accordance with the invention. The optically active layer was manufactured from a polymerizable mixture containing 0.6 wt. % of the diacrylate C6M (formula 3), 19.4 wt. % of the monoacrylate in accordance with formula 4, 40 wt. % of the non-reactive chiral CB15 (formula 5), 40 wt. % of the non-reactive achiral B164 (formula 6) and 1 wt. % of the photo-stabilizing compound Tinuvin P (Ciba Geigy; formula 1). A quantity of 2 wt. % of the photo-initiator Irgacure 651 was added to this mixture.

In the inventive cholesteric filter thus manufactured, the transmission spectrum remains unchanged at voltages up to approximately 40 V. At higher values the intensity of the broadband around 550 nm decreases rapidly. At approximately 56 V the peak has disappeared substantially completely. Also in this case, it has been found that the switchability of this broadband, cholesteric filter is very reproducible.

Figure 5:
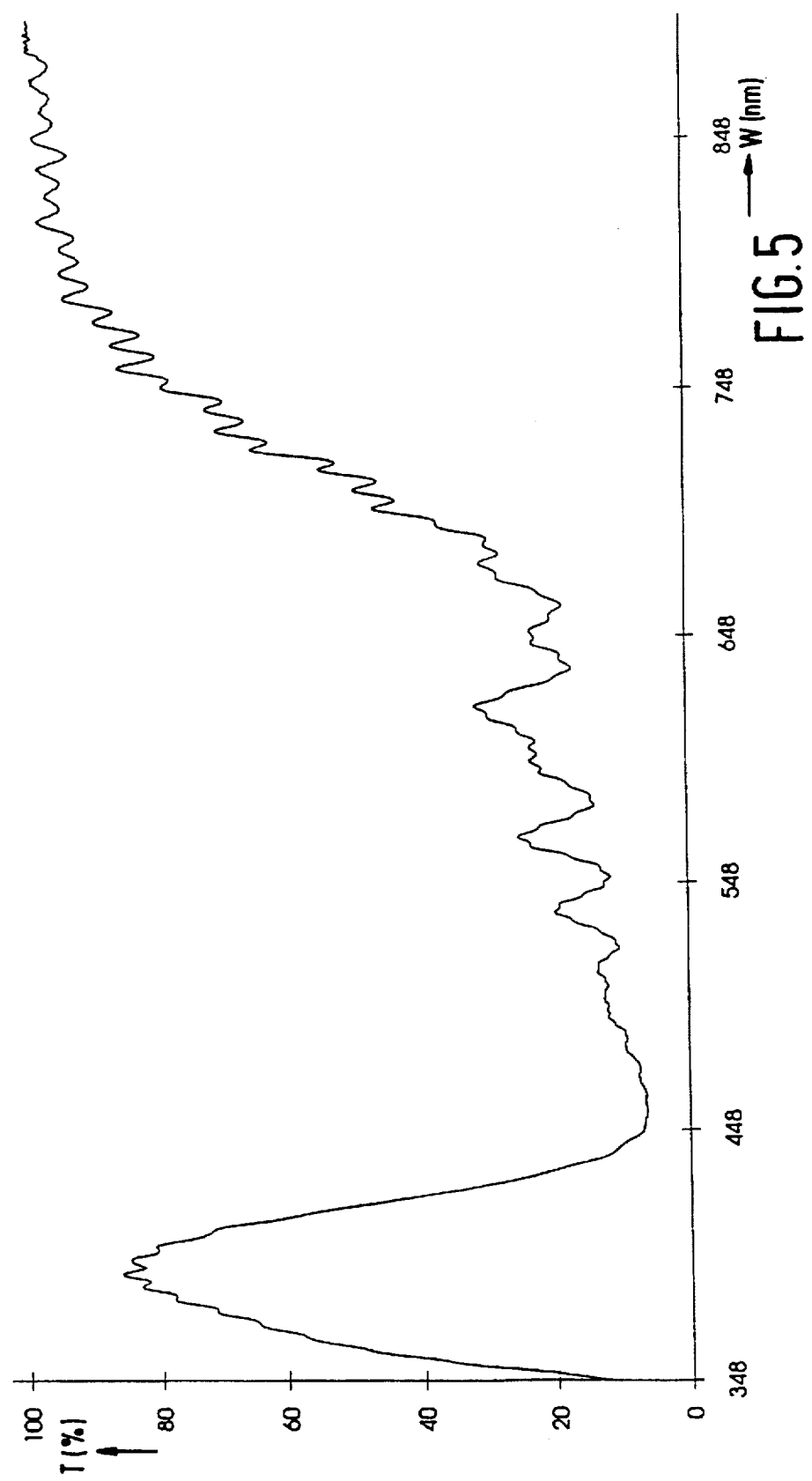
FIG. 5 shows a spectrum in which the transmission T is plotted as a function of the wavelength W of yet another inventive filter.

FIG. 5 shows the transmission spectrum of a third embodiment of a broadband, switchable cholesteric filter which was manufactured in accordance with the invention. In this case, the optically active layer was manufactured from a polymerizable mixture containing 0.4 wt. % of the diacrylate C6M (formula 3), 18.6 wt. % of the monoacrylate in accordance with formula 4, 40 wt. % of the non-reactive chiral CB15 (formula 5), 40 wt. % of the non-reactive achiral B164 (formula 6) and 1 wt. % of the photo-stabilizing cyano-stilbene in accordance with formula 2 of the formula sheet. A quantity of 0.5 wt. % of the photo-initiator Irgacure 651 was added to this mixture.

In this embodiment, the addition of the photo-stabilizing compound leads to a substantial widening of the transmission band of the filter after polymerization. The bandwidth obtained is approximately 300 nm. Further experiments, not shown, have revealed that, also in this case, the switchability of this broadband, cholesteric filter is very reproducible.

FIG. 7 shows a luminaire in accordance with the invention. Said luminaire comprises an envelope 11 which, if desired, may be provided with a reflector 12. Said envelope comprises a connection 13 for a light source 14, which is provided with electric connection wires (not shown). Said luminaire also comprises a broadband, switchable cholesteric filter 16 which can be switched by means of an electric device 17. The filter was manufactured as described hereinabove. The light generated by the light source 14 is directed to the filter 16, if desired via the reflector 12. The portion of the light corresponding to the helix of the cholesteric layer of the filter is reflected, whereas the rest of the light passes through the filter. The color and/or intensity of the reflected light can be changed by varying the voltage across the filter. This causes the characteristic of the transmitted light to be changed too.

The invention provides a simple method of manufacturing a broadband, switchable cholesteric filter. To this end, a mixture of polymerizable, liquid-crystalline molecules is provided between two substrates, which are each provided with an electrode. This mixture is subsequently polymerized with UV light to form an optically active layer having a three-dimensional polymeric network. If a photo-stabilizing compound is present in the polymerizable mixture, a relatively broadband, cholesteric filter is obtained.

I claim:

1. A method of manufacturing a switchable cholesteric filter comprising an optically active layer, in which a mixture of polymerizable, liquid-crystalline molecules is provided between two, substantially parallel substrates, which are each provided with an electrode for applying an electric field, said mixture subsequently being polymerized by means of UV light to form an optically active layer of cholesteric order comprising a three-dimensional network, characterized in that a quantity of a photo-stabilizing compound is added to the mixture, said quantity being not greater than about 5 wt. % of the overall volume of the mixture.

2. A method as claimed in claim 1, characterized in that a compound of the "excited state quencher" type is added as the photo-stabilizing compound.

3. A method as claimed in claim 2, characterized in that for the photo-stabilizing compound use is made of a compound whose composition corresponds to the formula

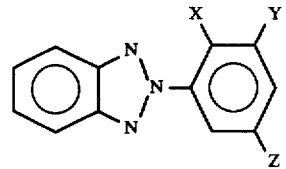

where X, Y and Z are moieties selected from the group consisting of H, OH, $CH_3$ and $C(CH_3)_3$.

4. A method as claimed in claim 2, characterized in that for the photo-stabilizing compound use is made of a compound whose composition corresponds to the formula

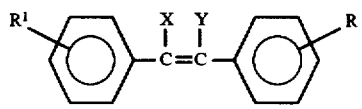

where X and Y are moieties selected from the groups consisting of H and an electron-accepting group such as CN or $NO_2$, and where R and R' are moieties from the groups consisting of H, an electron-accepting group such as CN or $NO_2$, an aliphatic group and an aromatic group.

5. A method as claimed in claim 1, characterized in that the mixture contains maximally 2 wt. % of monomers having at least two polymerizable groups, maximally 90 wt. % of liquid-crystalline monomers having one polymerizable group as well as a mixture of chiral and/or achiral liquid-crystalline molecules without a polymerizable group.

6. A method as claimed in claim 5, characterized in that the monomers having at least two polymerizable groups also include a liquid-crystalline group.

7. A method as claimed in claim 5, characterized in that (meth)acrylate groups are used as the polymerizable groups of the monomers.

8. A luminaire provided with a connection for a light source and with a cholesteric filter, characterized in that a switchable, cholesteric filter, as manufactured by means of the method claimed in claim 1 is used.

* * * * *